United States Patent
Wang et al.

(10) Patent No.: US 12,539,174 B2
(45) Date of Patent: Feb. 3, 2026

(54) PORTABLE VIRTUAL ENDOSCOPIC TOOL SIMULATOR WITH HAPTIC FEEDBACK ENHANCED HANDHELD CONTROLLER

(71) Applicants: Zhan Tao Wang, London (CA); Jeremy J. Cepek, London (CA)

(72) Inventors: Zhan Tao Wang, London (CA); Jeremy J. Cepek, London (CA)

( * ) Notice: Subject to any disclaimer, the term of this patent is extended or adjusted under 35 U.S.C. 154(b) by 212 days.

(21) Appl. No.: 18/563,955

(22) PCT Filed: May 18, 2022

(86) PCT No.: PCT/CA2022/050781
§ 371 (c)(1),
(2) Date: Nov. 24, 2023

(87) PCT Pub. No.: WO2022/246543
PCT Pub. Date: Dec. 1, 2022

(65) Prior Publication Data
US 2024/0252250 A1 Aug. 1, 2024

Related U.S. Application Data

(60) Provisional application No. 63/193,166, filed on May 26, 2021.

(51) Int. Cl.
*A61B 34/10* (2016.01)
*A61B 34/00* (2016.01)
(Continued)

(52) U.S. Cl.
CPC .............. *A61B 34/10* (2016.02); *A61B 34/25* (2016.02); *G06F 3/011* (2013.01); *G06F 3/016* (2013.01);
(Continued)

(58) Field of Classification Search
CPC .............. A61B 34/10; A61B 2034/102; A61B 2034/2057; G06F 3/011; G06F 3/016
See application file for complete search history.

(56) References Cited

U.S. PATENT DOCUMENTS

| | | |
|---|---|---|
| 6,857,878 B1 | 2/2005 | Chosack et al. |
| 6,939,138 B2 | 9/2005 | Chosack et al. |
| | (Continued) | |

FOREIGN PATENT DOCUMENTS

| | | |
|---|---|---|
| CA | 2484586 C | 6/2011 |
| GR | 2004-0100100 A | 12/2005 |
| WO | 2019/204615 A1 | 10/2019 |

OTHER PUBLICATIONS

International Search Report and Written Opinion dated Jul. 21, 2022 on PCT/CA2022/050781.
(Continued)

*Primary Examiner* — Gerald Johnson
(74) *Attorney, Agent, or Firm* — Brunet & Co. Ltd.; Robert Brunet; Hans Koenig

(57) ABSTRACT

An augmented reality/virtual reality (AR/VR) system, including a handheld controller, at least two imaging devices and a computer, is capable of simulating a variety of endoscopic, especially urological, procedures, for the purpose of training and/or equipment design evaluation. The handheld controller has inertial sensors for three axes of motion, user actuatable controls for causing the virtual urological endoscope to interact with a virtual urological environment and a haptic feedback generator for providing haptic feedback to the user. The at least two imaging devices are configured to obtain position information relating to the handheld controller and to provide the position information to the computer.

17 Claims, 2 Drawing Sheets

(51) Int. Cl.
*G06F 3/01* (2006.01)
*A61B 34/20* (2016.01)
(52) U.S. Cl.
CPC . *A61B 2034/102* (2016.02); *A61B 2034/2057* (2016.02)

(56) References Cited

U.S. PATENT DOCUMENTS

| | | | |
|---|---|---|---|
| 8,616,894 B2 | 12/2013 | Ehrhardt et al. | |
| 10,610,303 B2 | 4/2020 | Johnson et al. | |
| 2003/0091967 A1* | 5/2003 | Chosack | G09B 23/285 434/262 |
| 2010/0273134 A1* | 10/2010 | Chen | G09B 23/285 434/262 |
| 2019/0197919 A1 | 6/2019 | Vazquez | |

OTHER PUBLICATIONS

Al Bareeq R, Jayaraman S, Kiaii B, Schlachta C, Denstedt JD, Pautler SE. The role of surgical simulation and the learning curve in robot-assisted surgery. J Robot Surg. 2008;2(1):11-15.
Aljamal Y, et al. Journal of Surgical Research . Nov. 2019 (243 ) 560-566.
Aloosh M. is There a Role for Virtual Reality Simulators in Training Procedural Skills? A pilot study on flexible ureteroscopic stone extraction skills. MacGill University. Master's thesis submission: Nov. 2016.
Brewin J, Ahmed K, Challacombe B. An update and review of simulation in urological training. Int J Surg. 2014., 12:103-108.
Carnegie SW. Endoscopic Targeting Tasks Simulator: An Approach Using Game Engines. University of Western Ontario. (2015) Electronic Thesis and Dissertation Repository. 3248.
Chaloub M, et al. Advances in Medical Education and Practice (2018) 9: 541-547.
Chou DS, et al. Journal of Endourology. vol. 20, No. 4, Apr. 2006, 266-271.
Coles TR, et al. IEEE Transactions on Haptics, vol. 4, No. 1, (2011), 51-66.
Dargar S, et al. IEEE Transactions on Haptics, vol. 9, No. 3, Jul.-Sep. 2016, 333-344.
Gettman MT, Le CQ, Rangel LJ, Slezak JM, Bergstralh EJ, Krambeck AE. Analysis of a Computer Based Simulator as an Educational Tool for Cystoscopy: Subjective and Objective Results. J Urol. 2008;179(1):267-271.
Granado E, et al. Remote Experimentation Using a Smartphone Application with Haptic Feedback. 2016 IEEE Global Engineering Education Conference (EDUCON). Apr. 10-13, 2016, Abu Dhabi, UAE.
Ikuta K, et al. Portable Virtual Endoscope System with Force and Visual Display. Proceedings of the 2000 IEEE/RSJ International Conference on Intelligent Robots and Systems.
Jacomides L, et al. The Journal of Urology. vol. 171, 320-323, Jan. 2004.
John NW, et al. An Endoscope Interface for Immersive Virtual Reality. Eurographics Workshop on Visual Computing for Biology and Medicine (2020) K. Nieselt and R. G. Raidou (Editors).
Knoll T, Trojan L, Haecker A, Alken P, Michel MS. Validation of computer-based training in ureterorenoscopy. BJU Int. 2005. doi:10.1111/j.1464-410X.2005.05518.x.
Korzeniowski P, et al. Int J CARS (2016) 11:2303-2315.
Kunkler K. the International Journal of Medical Robotics and Computer Assisted Surgery Int J Med Robotics Comput Assist Surg 2006; 2: 203-210.
Leleve A, et al. Haptic Training Simulation. Frontiers in Virtual Reality www.frontiersin.org Jul. 2020 | vol. 1 | Article 3.
Matsumoto ED, et al. International Journal of Urology (2006) 13, 896-901.
Michel MS, et al. BJU International (2002) 89, 174-177.
Moon Y, et al. (JMIR Mhealth Uhealth 2020;8(9):e17057) doi: 10.2196/17057.
Ogan K, et al. The Journal of Urology. vol. 172, 667-671, Aug. 2004.
Preece R. The current role of simulation in urological training. Cent European J Urol. 2015; 68: 207-211.
Schout BMA, et al. Journal Compilation. 2009 BJU International | 105, 234-239.
Scott DJ, et al. J Gastrointest Surg (2008) 12:213-221.
Shah J, et al. BJU International (2002), 90, 828-832.
Shah J, et al. BJU International (2002), 90, 833-835.
Shane MD, et al. Surg Endosc (2008) 22:1294-1297.
Watterson JD, et al. The Journal of Urology. vol. 168, 1928-1932, Nov. 2002.
White MA, et al. The Journal of Urology. vol. 183, 673-677, Feb. 2010.
Wignall GR, et al. The Journal of Urology. vol. 179, 1690-1699, May 2008.
Wilhelm DM, et al. J Am Coll Surg. vol. 195, No. 5, Nov. 2002, 675-681.
Baas W, Schwartz B. Simulation in Urology. 2019:289-317.
Woodman R. Surgeons should train like pilots. BMJ. 1999;319(7220):1312.
Watterson JD, Denstedt JD. Ureteroscopy and cystoscopy simulation in urology. J Endourol. 2007;21(3):263-269.

* cited by examiner

PORTABLE VIRTUAL ENDOSCOPIC TOOL SIMULATOR WITH HAPTIC FEEDBACK ENHANCED HANDHELD CONTROLLER

CROSS-REFERENCE TO RELATED APPLICATIONS

This application is a national entry of International Patent Application PCT/CA2022/050781 filed May 18, 2022, which claims the benefit of United States Provisional Patent Application USSN 63/193,166 filed May 26, 2021, the entire contents of both of which are herein incorporated by reference.

FIELD

This application relates to devices, systems and methods for simulating endoscopy, particularly endoscopy related to urology.

BACKGROUND

Simulation is becoming increasingly popular for surgical training in numerous specialties. Traditionally the apprenticeship model of teaching has been utilized in surgery, with the mantra "see one, do one, teach one". In the apprenticeship model, residents develop surgical skills through supervised clinical instruction in the operating room. Despite the past success, there has been a recent shift away from apprenticeship for several reasons. First, there has been a rapid introduction of minimally invasive and more complex procedures over the past few decades, which require more training and pose a steep learning curve. Mastery is attained through repetition and experience, which has become increasingly more difficult in the operating room, as often attending surgeons are learning new techniques as well. Second, there is the debate of whether it is ethical or safe to train on real patients. Lastly, the model is increasingly limited by resident hour restrictions, and a need to contain costs. For these reasons, there has been an increased interest in simulation of procedures outside the operating room. Augmented reality (AR) and virtual reality (VR) are methods of simulation, which have shown potential in urology training. Just as flight simulators have been used in the aviation industry for years, allowing pilots to acquire skills without endangering passengers; AR/VR simulators allow trainees repeated attempts to master surgical skills, bypassing the steep learning curve phase without threatening the wellbeing of patients.

Endoscopy is extensively used in urology, and is an area in which simulation can greatly benefit trainees. There have been many different simulators of various types used for cystoscopy and ureteroscopy; however, the effectiveness of training depends on the validity of the model and simulator. There has been extensive research in validation of the various simulators over the past two decades, the most common being the URO Mentor™ (Simbionix™ Corp). The URO Mentor™ is a high-fidelity VR simulator that incorporates a physical model with a computer interface, used for cystoscopy and ureteroscopy. Most studies with the URO Mentor™ have focused on ureteroscopy, and it has been validated, showing improved outcomes in trainees.

There have only been a few studies focusing on validation of the simulator for cystoscopy, even though the procedure is essential for urologists to master. Although a device has been validated, the device is expensive, incorporating a physical model which is not necessarily needed for simulation of cystoscopy. The skills in cystoscopy that would benefit from simulation can be simulated without the physical model.

There remains a need for AR/VR simulators for endoscopy in urology that is portable and does not require a physical model.

SUMMARY

An augmented reality/virtual reality (AR/VR) system comprising a handheld controller, at least two imaging devices and a computer has now been developed, which is capable of simulating a variety of endoscopic procedures, including urological procedures, for the purpose of training, assessment and/or equipment design evaluation. The system is portable and has improved consistency, feasibility and cost effectiveness in comparison to known systems, without the need for a physical model.

In one aspect, there is provided a urological procedure simulator comprising: a user interface for control of a virtual urological endoscope by a user; and, a computer in electronic communication with the user interface, the computer configured with computer executable instructions to display the virtual urological endoscope and a virtual urological environment on a display screen, the computer further configured with computer executable instructions to adjust a position of the virtual urological endoscope on the display screen in response to user commands received from the user interface, the user interface comprising a handheld controller comprising inertial sensors for three axes of motion, user actuatable controls for causing the virtual urological endoscope to interact with the virtual urological environment, and a haptic feedback generator for providing haptic feedback to the user, and at least two imaging devices configured to obtain position information relating to the handheld controller and to provide the position information to the computer.

The user interface is used to provide input to the computer to control motion of the virtual urological endoscope in a virtual urological environment. The user interface comprises the handheld controller and the at least two imaging devices.

The handheld controller comprises inertial sensors for three axes of motion. The inertial sensors may be comprised in an inertial measurement unit (IMU) for tracking orientation of the handheld controller in three dimensions (e.g., yaw, pitch, roll). The inertial sensors may sense rotation about the three axes of motion of the handheld controller. The IMU thereby can track orientation in three degrees of freedom. Orientation information is transmitted to the computer and used to control the orientation of the virtual urological endoscope in the virtual urological environment. Some examples of inertial sensors include accelerometers, gyroscopes and magnetometers. Modern IMUs use a combination of input from several such sensors to provide a reliable estimate of orientation.

The virtual urological endoscope may be rigid (i.e., solid and non-deformable), semi-rigid (i.e., solid but able to be deflected against tissue/objects), or flexible (i.e., comprising a passively flexible portion and/or an actively flexible portion that is controlled by the user). Examples of types of endoscopes that may be simulated include cystoscopes, ureteroscopes, nephroscopes or resectoscopes. The simulation may mimic any feature of each of the types of endoscopes, for example one or more of function, shape and feel of the endoscopes. In the real world, each type of endoscope has a primary purpose of delivering a camera and a light within an organ of interest for inspection or for manipulation of an endoscopic tool, each endoscope featuring a working channel through which the endoscopic tool is passed by the user and exits through an orifice adjacent to the camera to be manipulated within the field of view of the camera. The endoscopic tool may be simulated as a virtual endoscopic tool in the virtual urological environment, whereby the virtual urological endoscope comprises the virtual endoscopic tool. Endoscopic tools may include, for example, wires, electrodes, laser fibers, ultrasound devices, graspers, biopsy forceps, scalpels, stone baskets, loops, roller-balls, etc.

In one example, a resectoscope is simulated as a virtual resectoscope, the virtual resectoscope being a rigid endoscope comprising an endoscopic tool (e.g., a loop, a roller-ball, a Collins knife) that may be used cold or with electrocautery. The orientation of the virtual resectoscope in the virtual urological environment can be manipulated with an actuation knob towards and away from a virtual endoscopic camera whose field of view in the virtual urological environment is simulated by the computer.

The handheld controller also further comprises user actuatable controls for causing the virtual urological endoscope to interact with the virtual urological environment. The user actuatable controls are preferably shaped and configured like common endoscopic controls. The user actuatable controls preferably comprise buttons, knobs and or levers, although other types of controls may be used. The user actuatable controls for causing the virtual urological endoscope to interact with the virtual urological environment may include, for example, a user actuatable control for actively flexing the virtual urological endoscope, a tool insertion control for simulating insertion of virtual endoscopic tools, an endoscopic tool control for actuating virtual endoscopic tools (e.g., graspers, biopsy forceps, etc.) and/or for activating energy sources (e.g., lasers, electrocauterizers, ultrasound devices, etc.), a system reset control, a start/stop control, and the like. In some embodiments, the user actuatable control may comprise a control (e.g., a knob) that controls flexion of the virtual urological endoscope, for example for curling a tip of the virtual urological endoscope. In some embodiments, the user actuatable control may comprise a control (e.g., a knob) that controls extent of insertion and retraction of the virtual endoscopic tool.

One or more of the user actuatable controls may be operably connected to one or more sensors, for example rotation sensors or linear position sensors, to provide position data to the computer in connection with the operation of the control. The sensors may operate mechanically, electronically and/or magnetically. The position data is used by the computer to control the position of the virtual urological endoscope and/or the virtual endoscopic tool in the virtual urological environment.

The handheld controller is further equipped with a haptic feedback generator for providing haptic feedback to the user. Haptic feedback may be generated by any suitable known method, for example vibrotactile haptics, ultrasonic mid-air haptics, microfluidics, force control and/or surface haptics. Vibrotactile haptics is particularly preferred whereby tiny motors create vibrations and other tactile effects in the handheld controller.

The user interface further comprises the at least two imaging devices configured to obtain position information relating to the handheld controller and to provide the position information to the computer. At least two imaging devices are used to be able to provide stereoscopic imaging to enable accurate position sensing of the handheld controller in 3D space. The position information is transmitted to the computer to control the position of the virtual urological endoscope in the virtual urological environment.

Preferably, two imaging devices are used. One or both of the at least two imaging devices may be situated in the handheld controller. One or both of the at least two imaging devices may be situated in an optical unit positionable remotely from the handheld controller. Preferably, the at least two imaging devices are situated in the optical unit positionable remotely from the handheld controller.

An imaging device may acquire an image of a fixed point in space remote from the handheld controller when the imaging device is situated in the handheld controller, or an imaging device may acquire an image of a fixed point on the handheld controller when the imaging device is situated in the optical unit positionable remotely from the handheld controller. In a preferred embodiment, the fixed point comprises a light source that can be detected by the imaging device. In some embodiments, the imaging device is an optical camera. In some embodiments, the light source is an infrared light source. In some embodiments, the imaging device is an infrared camera.

In some embodiments, the user interface further comprises an optical unit positionable remotely from the handheld controller, wherein the at least two imaging devices are situated in the controller and each imaging device has a field of view that includes the optical unit. In some preferred embodiments, the user interface further comprises an optical unit positionable remotely from the handheld controller, wherein the optical unit comprises the at least two imaging devices and each imaging device has a field of view that includes the handheld controller. In some preferred embodiments, the handheld controller comprises a light source that can be imaged by at least two imaging devices situated in an optical unit positionable remotely from the handheld controller.

The computer is in electronic communication with the user interface. Electronic communication may be accomplished wirelessly and/or through wires. Preferably, electronic communication is accomplished wirelessly, which provides greater portability and more options for configuring the simulator in a given physical environment. For wireless communication, the computer and the user interface are configured with wireless communication interfaces. The handheld controller, or both the handheld controller and the imaging devices may be configured with a wireless communication interface. The wireless communication interface may be an e/m transmitter, receiver or transceiver. The handheld controller preferably comprises an electronic processor that controls various electronic functions of the handheld controller including transmitting to and/or receiving electronic signals from the computer and/or the imaging devices. The electronic processor and other electrical devices (e.g., the light source) are preferably powered by a portable power source, e.g., a battery, housed in the handheld controller. Where the imaging devices also comprise a wireless interface, the imaging devices may also comprise an electronic processor. The imaging devices may also comprise portable power sources, e.g., batteries. The imaging devices may be incorporated into an optical unit, in which case the optical unit may comprise a processor, a wireless interface and a power source (e.g., a battery) for powering electrical components, e.g., light sources and imaging devices, as well as the electronic processor if present.

The computer comprises the usual computer components such as a programmed logic controller (PLC), computer memory (e.g., random access memory (RAM), read only memory (ROM) and/or a non-transient electronic storage medium (e.g., a hard drive)), an input device (e.g., a computer mouse, a keyboard, a microphone and/or a camera) and an output device (e.g., a monitor and/or a speaker). The computer may be a mobile device (e.g., a portable telephone such as a smart phone or a portable tablet computer), a laptop computer or a desktop computer. Preferably, the computer is portable. The computer may be in electronic communication with a remote computer (e.g., a server) and communicate with the remote computer through a network, e.g., the internet.

The computer is configured with data and computer executable instructions to display and control the virtual urological environment and the virtual urological endoscope therein. The computer executable instructions embody a software application. The software application is configured to receive information and data from the handheld controller or both the handheld controller and imaging devices. The software application then utilizes the information and data to control the appearance of the virtual urological environment and the position and movement of the virtual urological endoscope in the virtual urological environment.

For example, an up/down translation of the handheld controller could cause the virtual urological endoscope to move in/out of the virtual urological environment as if the endoscope was being inserted/retracted in a real urological environment. A rotation of the handheld controller could cause the virtual urological endoscope to rotate in the virtual urological environment. Actuation of a tool actuation knob on the handheld controller could cause movement of the virtual urological endoscope towards and away from a virtual endoscopic camera when the software is simulating a resectoscope, or cause flexion of the virtual urological endoscope when the software is simulating a flexible cystoscope/ureteroscope. Actuation of a tool insertion control knob on the handheld controller could cause a virtual endoscopic tool to be inserted in or retracted from a virtual target. Actuation of an endoscopic tool control for actuating virtual endoscopic tools on the handheld controller could cause a simulated laser beam to strike a virtual target.

In some embodiments, the virtual urological environment contains one or more virtual targets. A virtual target may comprise a feature of a urological environment on which an endoscopic tool is intended to act. Some examples of targets are a kidney stone, a lesion on a wall of a urethra, a bladder tumor or a portion of the virtual urological environment from which to take a biopsy sample.

In some embodiments, the software application comprises multiple levels with increasing levels of difficulty and additional skills/procedures, and may be designed to train a user through progressive tasks of increasing difficulty.

In some embodiments, the software application tracks user performance relating to interaction between the virtual urologic endoscope and the virtual urological environment. The software application may also provide feedback to the user relating to the performance during a simulated urological procedure and/or after completion of the simulated urological procedure. The software may also allow for user customization of the levels, including but not limited to, adjusting difficulty and combining skills. The software may also auto-generate summary reports on users, which include overall level competencies, for example compared to peer and to expert, as well as recommend areas for improvement and, in some embodiments, steps to adjust to achieve these improvements. The software may also allow users to track their progress and participate in a 'global' ranking system, which may be achieved by conventional programming, or by machine learning (deep learning).

The handheld controller and/or the at least two imaging devices and/or the optical unit may also comprise a programming port to software embedded in each to be modified. Modifications of the software may include, for example, recalibrating sensors, modifying communication protocol or type of data transmitted, providing improved image processing algorithms, modifying tactile feedback patterns, etc.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
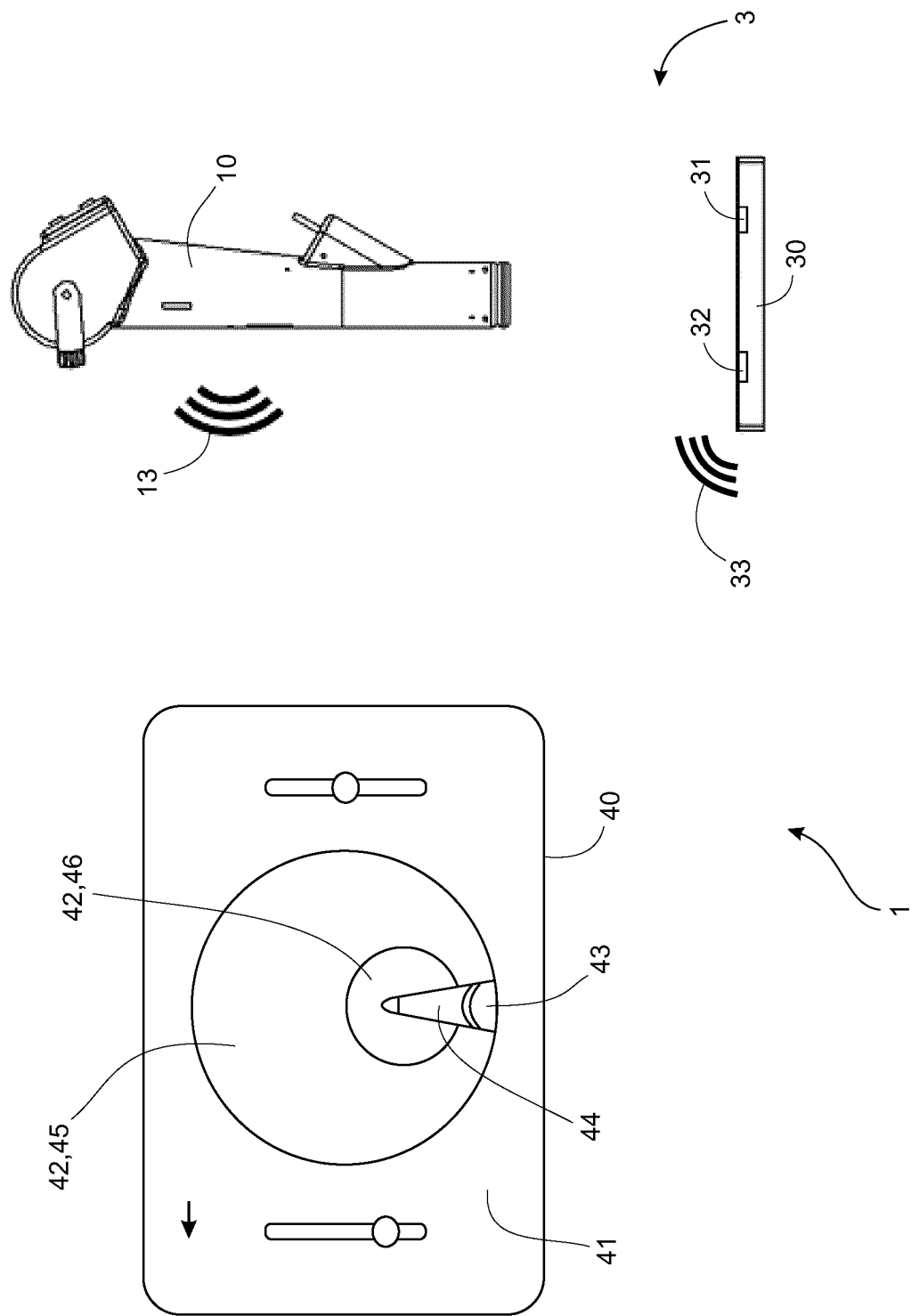
FIG. 1 depicts a schematic diagram of a portable system for simulating urological procedures.
Figure 2:
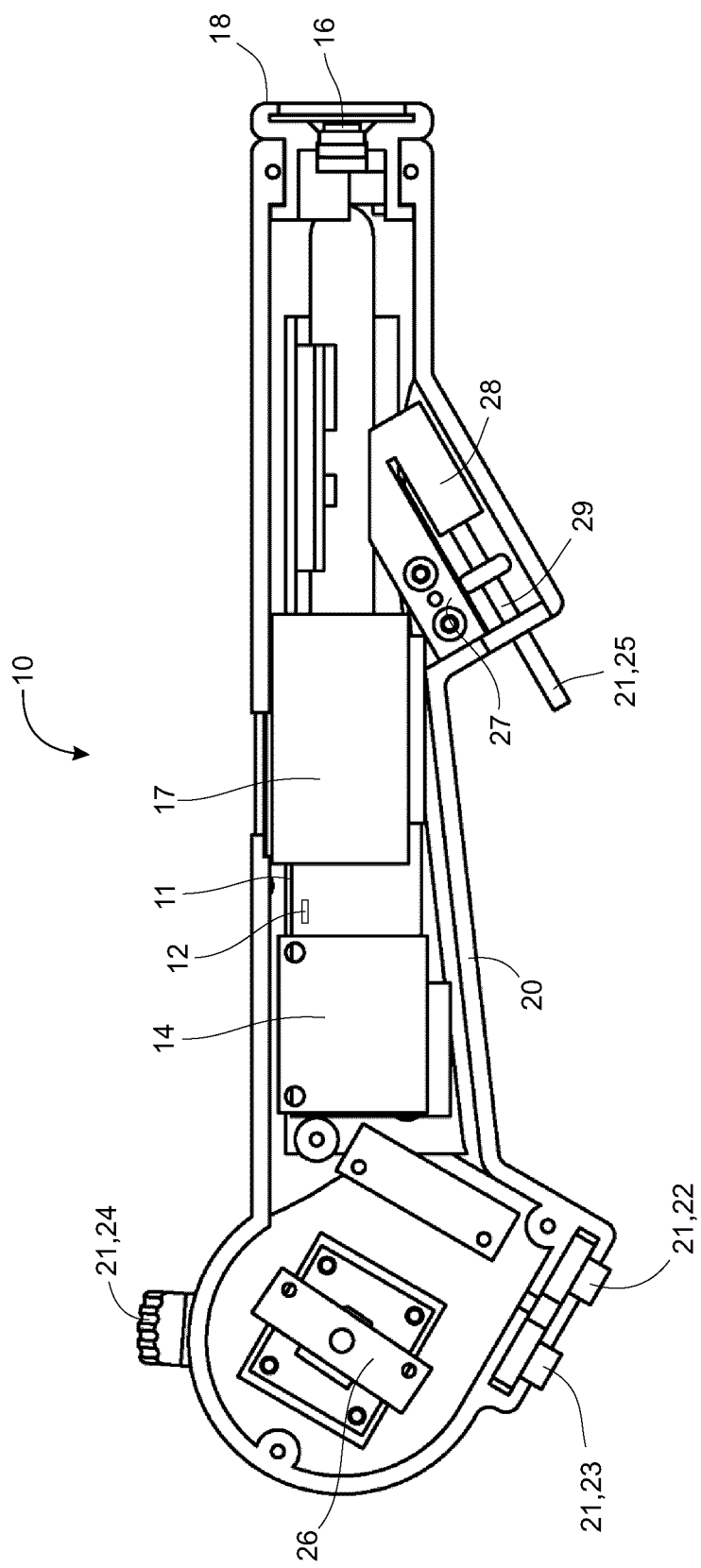
FIG. 2 depicts a handheld controller of the system of FIG. 1.

With reference to FIG. 1 and FIG. 2, a portable system 1 for simulating urological procedures comprises a user interface 3 comprising a handheld controller 10 and an optical unit 30, the system 1 further comprising a mobile device 40 (e.g., a computer tablet) comprising a visual display 41 and having simulation software programmed therein.

The handheld controller 10 has a casing 20 having control actuators 21 thereon, the casing 20 and the control actuators 21 shaped and configured to closely resemble common endoscopes used in urology. The casing 20 houses a main processing board 11 programmed to operate electronic components of the handheld controller 10, including a wireless module 12 situated on the main processing board 11. A battery 17 (e.g., a lithium polymer battery) powers electronic components of the handheld controller 10. The wireless module 12 transmits an electronic signal 13 to the mobile device 40, the electronic signal 13 carrying data about the status and operation of the handheld controller 10 (e.g., position, orientation and control data) on which the simulation software acts. The casing 20 also houses an inertial measurement unit (IMU) 14 in electronic communication with the main processing board 11 for tracking 3D orientation of the handheld controller 10. The casing 20 further supports an infrared light source 16 (e.g., one or more IR light emitting diodes (LEDs)) conveniently located at a base 18 end of the handheld controller 10, the infrared light source 16 being tracked by the optical unit 30 for tracking 3D position of the handheld controller 10 in space.

The control actuators 21 are shaped and configured like common endoscopic controls. The control actuators 21 include an endoscopic tool control button 22, a system reset button 23, a flexion knob 24 for control of endoscope flexion, and a tool insertion control knob 25 for simulating insertion of common tools (e.g., wires, laser fibers, ultrasound devices, graspers, biopsy forceps, scalpels, etc.). The flexion knob 24 is operably connected to a rotation sensor 26, the rotation sensor 26 in electronic communication with the main processing board 11 programmed to provide rotational position data in connection with the operation of the flexion knob 24. Real urological endoscopes have a tip curl feature that is unique and there is no off-the-shelf handheld controller that can be purchased to simulate all functions including the tip curl. The flexion knob 24 together with the rotation sensor 26 very closely resembles common endoscope control of the tip curl feature. The tool insertion control knob 25 is operably connected to a linear actuator 28, which is associated with a linear position sensor 27. The linear position sensor 27 senses translation position of a rod 29 of the linear actuator 28. The linear position sensor 27 is in electronic communication with the main processing board 11 programmed to provide translational position data in connection with the linear actuator 28 resulting from operation of the tool insertion control knob 25.

The optical unit 30 comprises at least two infrared cameras, for example two infrared cameras 31, 32, that track infrared light emitted from the infrared light source 16 to compute the 3D position of the handheld controller 10 relative to the optical unit 30. Position information is transmitted to the mobile device 40 in an electronic signal 33 from the optical unit 30.

While the handheld controller 10 is shown with an infrared light source 16, and the optical unit 30 is shown with two infrared cameras 31, 32, the handheld controller could be equipped with infrared cameras and the optical unit 30 equipped with an infrared light source, in which case the wireless module of the handheld controller could be used to transmit position information to the mobile device 40. In other embodiments, each of the handheld controller and optical unit could be equipped with infrared cameras and IR light sources. In some embodiments, the optical unit could transmit data to the wireless module of the handheld controller for retransmission to the mobile device, in which case the wireless module must contain a wireless transceiver. Furthermore, the infrared light source could be absent or replaced with a visible light source, and the optical unit equipped with two visible light cameras.

The mobile device 40 has a software application programmed therein, which displays on the visual display 41 a simulated endoscopic environment 42 that an endoscopic camera would see within a real endoscopic environment (e.g., a bladder 45, a ureter 46 or a renal collecting system). The application also displays a simulated endoscope 43 comprising a simulated endoscopic tool 44 at an end thereof. Distance between the handheld controller 10 and the optical unit 30 simulates insertion depth of the simulated endoscope 43 into the simulated endoscopic environment 42. The handheld controller 10 provides input to the software application to control the motion of the simulated endoscope 43 in the simulated endoscopic environment 42.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A urological procedure simulator comprising:
 a user interface for control of a virtual urological endoscope by a user; and
 a computer in electronic communication with the user interface, the computer configured with computer executable instructions to display the virtual urological endoscope and a virtual urological environment on a display screen, the computer further configured with computer executable instructions to adjust a position of the virtual urological endoscope on the display screen in response to user commands received from the user interface,
 wherein the user interface comprises:
  a handheld controller comprising inertial sensors for three axes of motion, user actuatable controls for causing the virtual urological endoscope to interact with the virtual urological environment, and a haptic feedback generator for providing haptic feedback to the user;
  at least two imaging devices configured to obtain position information relating to the handheld controller and to provide the position information to the computer; and
  an optical unit positionable remotely from the handheld controller, wherein the optical unit comprises the at least two imaging devices and each imaging device has a field of view that includes the handheld controller.

2. The simulator of claim 1, wherein the handheld controller is in electronic communication with the computer.

3. The simulator of claim 1, wherein the inertial sensors sense translation along and/or rotation about the three axes of motion of the handheld controller.

4. The simulator of claim 1, wherein the virtual urological environment contains a virtual target, the virtual urological target comprising a kidney stone, a lesion on a wall of a urethra, a bladder tumor or a portion of the virtual urological environment from which to take a biopsy sample.

5. The simulator of claim 1, wherein the virtual urological endoscope further comprises a virtual endoscopic tool.

6. The simulator of claim 5, wherein the virtual endoscopic tool comprises a wire, an electrode, a laser fiber, an ultrasound device, a grasper, biopsy forceps, a scalpel, a stone basket, a loop or a roller-ball.

7. The simulator of claim 1, wherein the user actuatable controls for causing the virtual urological endoscope to interact with the virtual urological environment comprise buttons and/or knobs.

8. The simulator of claim 1, wherein the at least two imaging devices comprise optical cameras.

9. The simulator of claim 1, wherein the computer is a mobile device, a laptop computer or a desktop computer.

10. The simulator of claim 9, wherein the mobile device is a tablet computer or a portable telephone.

11. The simulator of claim 1, wherein the user interface and the computer are configured with wireless communication interfaces for wireless electronic communication and the computer is in wireless electronic communication with the user interface.

12. The simulator of claim 1, wherein the at least two imaging devices are situated in the controller.

13. The simulator of claim 1, wherein the computer is configured with computer executable instructions to track user performance metrics relating to interaction between the virtual urologic endoscope and the virtual urological environment and to provide feedback to the user relating to the performance metrics during a simulated urological procedure and/or after completion of the simulated urological procedure.

14. The simulator of claim 1, wherein the user actuatable controls comprise a user actuatable control for curling the tip of the virtual urological endoscope.

15. A urological procedure simulator comprising:
 a user interface for control of a virtual urological endoscope by a user; and a computer in electronic communication with the user interface, the computer configured with computer executable instructions to display the virtual urological endoscope and a virtual urological environment on a display screen, the computer further configured with computer executable instructions to adjust a position of the virtual urological endoscope on the display screen in response to user commands received from the user interface, wherein the user interface comprise:
- a handheld controller comprising inertial sensors for three axes of motion, user actuatable controls for causing the virtual urological endoscope to interact with the virtual urological environment, and a haptic feedback generator for providing haptic feedback to the user;
- at least two imaging devices configured to obtain position information relating to the handheld controller and to provide the position information to the computer; and
- an optical unit positionable remotely from the handheld controller, wherein the at least two imaging devices are situated in the controller and each imaging device has a field of view that includes the optical unit.

16. A urological procedure simulator comprising:

a user interface for control of a virtual urological endoscope by a user; and a computer in electronic communication with the user interface, the computer configured with computer executable instructions to display the virtual urological endoscope and a virtual urological environment on a display screen, the computer further configured with computer executable instructions to adjust a position of the virtual urological endoscope on the display screen in response to user commands received from the user interface, wherein the user interface comprise:
- a handheld controller comprising inertial sensors for three axes of motion, user actuatable controls for causing the virtual urological endoscope to interact with the virtual urological environment, and a haptic feedback generator for providing haptic feedback to the user; and
- at least two imaging devices configured to obtain position information relating to the handheld controller and to provide the position information to the computer, wherein the computer is configured with computer executable instructions to track user performance metrics relating to interaction between the virtual urologic endoscope and the virtual urological environment and to provide feedback to the user relating to the performance metrics during a simulated urological procedure and/or after completion of the simulated urological procedure.

17. A urological procedure simulator comprising:

a user interface for control of a virtual urological endoscope by a user; and a computer in electronic communication with the user interface, the computer configured with computer executable instructions to display the virtual urological endoscope and a virtual urological environment on a display screen, the computer further configured with computer executable instructions to adjust a position of the virtual urological endoscope on the display screen in response to user commands received from the user interface, wherein the user interface comprise:
- a handheld controller comprising inertial sensors for three axes of motion, user actuatable controls for causing the virtual urological endoscope to interact with the virtual urological environment, and a haptic feedback generator for providing haptic feedback to the user; and
- at least two imaging devices configured to obtain position information relating to the handheld controller and to provide the position information to the computer, wherein the user actuatable controls comprise a user actuatable control for curling the tip of the virtual urological endoscope.

* * * * *